US012563349B2

(12) United States Patent
Yang et al.

(10) Patent No.: US 12,563,349 B2
(45) Date of Patent: Feb. 24, 2026

(54) SPEAKER

(71) Applicant: MERRY ELECTRONICS (SUZHOU) CO., LTD., Suzhou (CN)

(72) Inventors: Ye Yang, Suzhou (CN); LuYao Zhang, Suzhou (CN); ChangBiao Dai, Suzhou (CN)

(73) Assignee: MERRY ELECTRONICS (SUZHOU) CO., LTD., Suzhou (CN)

( * ) Notice: Subject to any disclaimer, the term of this patent is extended or adjusted under 35 U.S.C. 154(b) by 345 days.

(21) Appl. No.: 18/131,427

(22) Filed: Apr. 6, 2023

(65) Prior Publication Data

US 2023/0328460 A1 Oct. 12, 2023

(30) Foreign Application Priority Data

Apr. 7, 2022 (CN) ......................... 202210359462.7

(51) Int. Cl.
*H04R 23/02* (2006.01)
*H04R 1/02* (2006.01)
(Continued)

(52) U.S. Cl.
CPC ............. *H04R 23/02* (2013.01); *H04R 1/023* (2013.01); *H04R 1/025* (2013.01); *H04R 7/04* (2013.01);
(Continued)

(58) Field of Classification Search
CPC ........ H04R 23/02; H04R 1/023; H04R 1/025; H04R 7/04; H04R 7/18; H04R 9/025;
(Continued)

(56) References Cited

U.S. PATENT DOCUMENTS

2011/0170736 A1* 7/2011 Li .......................... H04R 9/025 381/401

FOREIGN PATENT DOCUMENTS

CN 201629838 U * 11/2010 ............... H04R 9/06
CN 201657287 U * 11/2010 ............... H04R 9/06
(Continued)

OTHER PUBLICATIONS

Chinese Office Action and Search Report for Chinese Application No. 202210359462.7, dated May 21, 2025, with English translation.
(Continued)

*Primary Examiner* — Angelica M McKinney
(74) *Attorney, Agent, or Firm* — Birch, Stewart, Kolasch & Birch, LLP

(57) ABSTRACT

A speak includes a housing, a diaphragm, a first vibrating assembly, and a second vibrating assembly. The housing has an accommodating groove. The diaphragm is relatively arranged in the accommodating groove. The diaphragm includes a first diaphragm part and a second diaphragm part. The second diaphragm part is arranged around the first diaphragm part. The first vibrating assembly is arranged on the first diaphragm part, for driving the first diaphragm part. A movable space is formed between the first diaphragm part and the bottom of the accommodating groove. The second vibrating assembly is on the peripheral side of the movable space. The first vibrating assembly vibrating through piezo-electric means.

19 Claims, 6 Drawing Sheets

(51) Int. Cl.

| | |
|---|---|
| ***H04R 7/04*** | (2006.01) |
| ***H04R 7/18*** | (2006.01) |
| ***H04R 9/02*** | (2006.01) |
| ***H04R 9/06*** | (2006.01) |
| ***H04R 17/00*** | (2006.01) |

(52) U.S. Cl.
CPC ............... *H04R 7/18* (2013.01); *H04R 9/025* (2013.01); *H04R 9/063* (2013.01); *H04R 17/00* (2013.01); *H04R 2400/11* (2013.01)

(58) Field of Classification Search
CPC .... H04R 9/063; H04R 17/00; H04R 2400/11; H04R 1/2803; H04R 7/122; H04R 9/06; H04R 11/02; H04R 1/24; H04R 7/16; H04R 2205/026; H04R 1/403
See application file for complete search history.

(56) References Cited

FOREIGN PATENT DOCUMENTS

| | | | | | | |
|---|---|---|---|---|---|---|
| CN | 204425652 | U | | 6/2015 | | |
| CN | 105554655 | A | * | 5/2016 | ............... | H04R 9/02 |
| CN | 212086479 | U | | 12/2020 | | |
| CN | 214101747 | U | | 8/2021 | | |
| CN | 215991191 | U | | 3/2022 | | |
| CN | 217088147 | U | | 7/2022 | | |
| GB | 1 383 078 | | | 2/1975 | | |
| JP | 60-165900 | A | | 8/1985 | | |
| JP | 4-33200 | B2 | | 6/1992 | | |
| JP | 2017-228958 | A | | 12/2017 | | |
| KR | 100769885 | B1 | * | 10/2007 | ............... | H04R 7/16 |
| TW | 201511582 | A | | 3/2015 | | |
| TW | 201840208 | A | | 11/2018 | | |
| TW | M641826 | U | | 6/2023 | | |
| WO | WO 2021/129456 | A1 | | 7/2021 | | |

OTHER PUBLICATIONS

Wang et al., "Research on Development of High-Intensity Sound Directional System," Electroacoustic Technology, vol. 44, No. 9, Feb. 7, 2021, pp. 38-42, with an English abstract.

Chinese Office Action and Search Report for Chinese Application No. 202210359462.7, dated Oct. 25, 2025, with English translation.

* cited by examiner

SPEAKER

CROSS-REFERENCE TO RELATED APPLICATION

This application claims the priority benefit of Chinese Patent Application Serial Number 202210359462.7, filed on Apr. 7, 2022, the full disclosure of which is incorporated herein by reference.

BACKGROUND

Technical Field

The present disclosure relates to the technical field of dual drive resonance for sounds, particularly to a speaker.

Related Art

In the prior art, the current mainstream earphones are dynamic speakers. Its working principle is that the magnetic field exerts a force on the powered conductor, and then the changing current passes through the voice coil to generate a corresponding change in the magnetic field, which makes the diaphragm of the speaker vibrate, pushes the surrounding air to vibrate, and produces sound. The sound has excellent low-frequency performance, but usually has a large size, fast high-frequency attenuation, and slightly poor high-frequency performance. The overall performance of the moving iron speaker is slightly better than that of the moving coil. The moving iron speaker has fast response and strong transient analysis ability. However, due to the small area of the actual diaphragm, it is difficult to achieve dynamic sensitivity at low frequencies, the reverberation is insufficient, and the frequency response range between low frequency and high frequency is insufficient. Others such as electrostatic speakers have excellent high-frequency and distortion performance. The piezoelectric speaker is similar to the moving iron earphone core, and its high-frequency performance is excellent, but the low-frequency sensitivity is insufficient. In addition, there is also a combination of moving coil earphone core and moving iron earphone core into a set of earphone structure to supplement the frequency response of the whole frequency band, but the structure is complicated, and the size and cost do not have advantages.

SUMMARY

The embodiment of the present disclosure provides a speaker, which solves the problem of the poor sensitivity in the high-frequency or low-frequency.

In one aspect, the present disclosure provides a speaker comprising a housing, a diaphragm, a first vibrating assembly, and a second vibrating assembly. The housing has an accommodating groove. The diaphragm is relatively arranged in the accommodating groove. The diaphragm includes a first diaphragm part and a second diaphragm part. The second diaphragm part is arranged around the first diaphragm part. The first vibrating assembly is arranged on the first diaphragm part, for driving the first diaphragm part. A movable space is formed between the first diaphragm part and a bottom of the accommodating groove. The second vibrating assembly is arranged in the accommodating groove, for driving the second diaphragm part. The second vibrating assembly is arranged around the peripheral side of the movable space.

In one embodiment, the second vibrating assembly is arranged around a peripheral side of the movable space and does not interfere with the movable space.

In one embodiment, the first vibrating assembly comprises a first bottom plate, a first bracket and a first vibrating element; the first bracket is arranged on the peripheral side of the first bottom plate; the first bracket is connected to the first diaphragm part; the first vibrating element is arranged on a first bottom plate; the first vibrating element is located in the first bracket; the first vibrating element is connected to the first diaphragm part; the second vibrating assembly comprises a second bracket and a second vibrating element; the second bracket is connected between the second vibrating element and the second diaphragm part.

In one embodiment, the first diaphragm part comprises a first membrane, a first ring and a first connecting membrane; the first ring is arranged on a peripheral side of the first membrane; the first connecting membrane is arranged on a peripheral side of the first ring; the second diaphragm part comprises a second ring and a second connecting membrane; the second ring is arranged on a peripheral side of the first connecting membrane; the second connecting membrane is arranged on a peripheral side of the second ring; the first vibrating element is connected to the first membrane; the first bracket is connected to the first connecting membrane; the second bracket is connected to the second connecting membrane.

In one embodiment, the speaker further comprises a middle sticker; the middle sticker is arranged on one side of the first membrane away from the first vibrating assembly.

In one embodiment, the first vibrating assembly comprises a first bottom plate, a first bracket and a first vibrating element; the first bracket is arranged on a peripheral side of the first bottom plate; the first bracket is connected to the first diaphragm part; the first vibrating element is arranged on the first bottom plate; the first vibrating element is located in the first bracket; the first vibrating element is connected to the first diaphragm part; the second vibrating assembly comprises a voice coil and a magnetic component; one end of the voice coil is connected to the second diaphragm part; an another end of the voice coil is located in the magnetic component.

In one embodiment, the first diaphragm part comprises a first membrane, a first ring and a first connecting membrane; the first ring is arranged on a peripheral side of the first membrane; the first connecting membrane is arranged on a peripheral side of the first ring; the second diaphragm part comprises a second membrane, a second ring and a second connecting membrane; the second membrane is arranged on a peripheral side of the first connecting membrane; the second ring is arranged on a peripheral side of the second membrane; the second connecting membrane is arranged on a peripheral side of the second ring; the first vibrating element is connected to the first membrane; the first bracket is connected to the first connecting membrane; the first bracket is connected to the first connecting membrane; one end of the voice coil is connected to the second membrane; the second connecting membrane is fixed on the housing.

In one embodiment, the speaker further comprises a first middle sticker and a second middle sticker; the first middle sticker is arranged on the side of the first membrane away from the first vibration assembly; the second middle sticker is arranged on the first connecting membrane and the second membrane.

In one embodiment, the magnetic assembly comprises a magnetic carrier plate, a magnetic body and a magnetic member; the magnetic carrier plate comprises a magnetic bottom plate and a magnetic side wall; the magnetic side wall is arranged on the inner side of the magnetic bottom plate; the magnetic body is arranged on the magnetic bottom plate; a space is formed between the magnetic body and the magnetic carrier plate; the magnetic remember is arranged on the magnetic body; the another end of the voice coil is located within the space.

In one embodiment, the first vibrating assembly further comprises a second perforation and a second mesh; the first bottom plate, the first bracket and the first diaphragm part form a cavity; the second perforation is on the first bottom plate; the second perforation communicates with the cavity and the accommodating groove; the second mesh covers the second perforation.

In one embodiment, the speaker further comprises a first perforation and a first mesh; the first perforation is located on the housing; the first perforation communicates with the accommodating groove; the first mesh covers the first perforation.

In one embodiment, the first vibrating assembly vibrates through piezoelectric means; the second vibrating assembly vibrates through electromagnetic induction or piezoelectric means In another aspect, the present disclosure provides a speaker comprising a housing, a diaphragm, a first vibrating assembly, and a second vibrating assembly. The housing has an accommodating groove. The diaphragm is relatively arranged in the accommodating groove. The diaphragm comprises a first diaphragm part and a second diaphragm part. The second diaphragm part is arranged around the first diaphragm part. The first vibrating assembly is arranged on the first diaphragm part, for driving the first diaphragm part; the first vibrating assembly vibrates through piezoelectric means. The second vibrating assembly is arranged in the accommodating groove, for driving the first diaphragm part.

In one embodiment, a movable space is formed between the first vibrating assembly and the bottom of the accommodating groove; the second vibrating assembly is arranged around the peripheral side of the movable space.

In one embodiment, the second vibrating assembly vibrates through electromagnetic induction or piezoelectric means.

In one embodiment, the first vibrating assembly comprises a first bottom plate, a first bracket and a first vibrating element; the first bracket is arranged on a peripheral side of the first bottom plate; the first bracket is connected to the first diaphragm part; the first vibrating element is arranged on the first bottom plate; the first vibrating element is located in the first bracket; the first vibrating element is connected to the first diaphragm part; the second vibrating assembly comprises a second bracket and a second vibrating element; the second bracket is connected between the second vibrating element and the second diaphragm part.

In one embodiment, the first diaphragm part comprises a first membrane, a first ring and a first connecting membrane; the first ring is arranged on a peripheral side of the first membrane; the first connecting membrane is arranged on a peripheral side of the first ring; the second diaphragm part comprises a second ring and a second connecting membrane; the second ring is arranged on a peripheral side of the first connecting membrane; the second connecting membrane is arranged on the peripheral side of the second ring; the first vibrating element is connected to the first membrane; the first bracket is connected to the first connecting membrane; the second bracket is connected to the second connecting membrane.

In one embodiment, the first vibrating assembly comprises a first bottom plate, a first bracket and a first vibrating element; the first bracket is arranged on a peripheral side of the first bottom plate; the first bracket is connected to the first diaphragm part; the first vibrating element is arranged on the first bottom plate; the first vibrating element is located in the first bracket; the first vibrating element is connected to the first diaphragm part; the second vibrating assembly comprises a voice coil and a magnetic component; one end of the voice coil is connected to the second diaphragm part; an another end of the voice coil is located in the magnetic component.

In one embodiment, the first diaphragm part comprises a first membrane, a first ring and a first connecting membrane; the first ring is arranged on a peripheral side of the first membrane; the first connecting membrane is arranged on a peripheral side of the first ring; the second diaphragm part comprises a second membrane, a second ring and a second connecting membrane; the second membrane is arranged on a peripheral side of the first connecting membrane; the second ring is arranged on a peripheral side of the second membrane; the second connecting membrane is arranged on a peripheral side of the second ring; the first vibrating element is connected to the first membrane; the first bracket is connected to the first connecting membrane; the first bracket is connected to the first connecting membrane; one end of the voice coil is connected to the second membrane; the second connecting membrane is fixed on the housing.

The disclosure provides a speaker respectively configured with the first vibrating assembly and the second vibrating assembly for the full frequency band and the low frequency compensation frequency band, so that the full frequency band of the first vibrating assembly and the low frequency compensation frequency band of the second vibrating assembly is complementary. Users can also independently input signals to the first vibrating assembly and the second vibrating assembly according to usage conditions, and achieve optimized frequency response and sound quality by adjusting signal strengths in different frequency bands.

It should be understood, however, that this summary may not contain all aspects and embodiments of the present disclosure, that this summary is not meant to be limiting or restrictive in any manner, and that the disclosure as disclosed herein will be understood by one of ordinary skill in the art to encompass obvious improvements and modifications thereto.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE EMBODIMENTS

The present disclosure will now be described more fully hereinafter with reference to the accompanying drawings, in which exemplary embodiments of the disclosure are shown. This present disclosure may, however, be embodied in many different forms and should not be construed as limited to the embodiments set forth herein. Rather, these embodiments are provided so that this present disclosure will be thorough and complete, and will fully convey the scope of the present disclosure to those skilled in the art.

Certain terms are used throughout the description and following claims to refer to particular components. As one skilled in the art will appreciate, manufacturers may refer to a component by different names. This document does not intend to distinguish between components that differ in name but function. In the following description and in the claims, the terms "include/including" and "comprise/comprising" are used in an open-ended fashion, and thus should be interpreted as "including but not limited to". "Substantial/substantially" means, within an acceptable error range, the person skilled in the art may solve the technical problem in a certain error range to achieve the basic technical effect.

The following description is of the best-contemplated mode of carrying out the disclosure. This description is made for the purpose of illustration of the general principles of the disclosure and should not be taken in a limiting sense. The scope of the disclosure is best determined by reference to the appended claims.

Moreover, the terms "include", "contain", and any variation thereof are intended to cover a non-exclusive inclusion. Therefore, a process, method, object, or device that includes a series of elements not only includes these elements, but also includes other elements not specified expressly, or may include inherent elements of the process, method, object, or device. If no more limitations are made, an element limited by "include a/an . . . " does not exclude other same elements existing in the process, the method, the article, or the device which includes the element.

Figure 1:
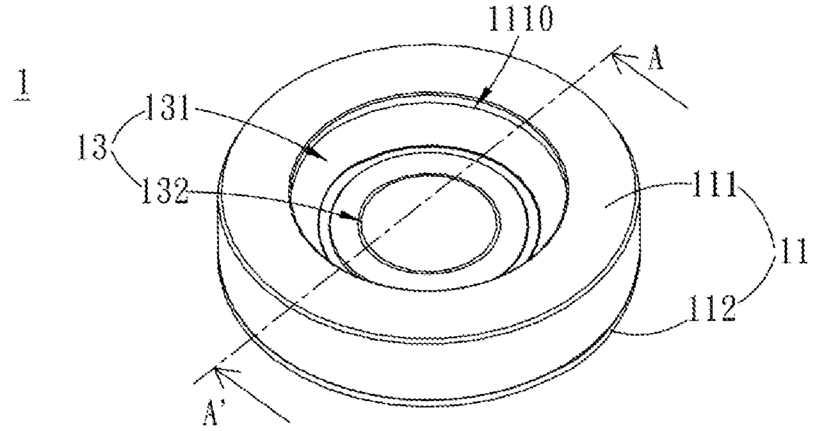
FIG. 1 is the perspective view of the speaker of the first embodiment of the present disclosure.
Figure 2:
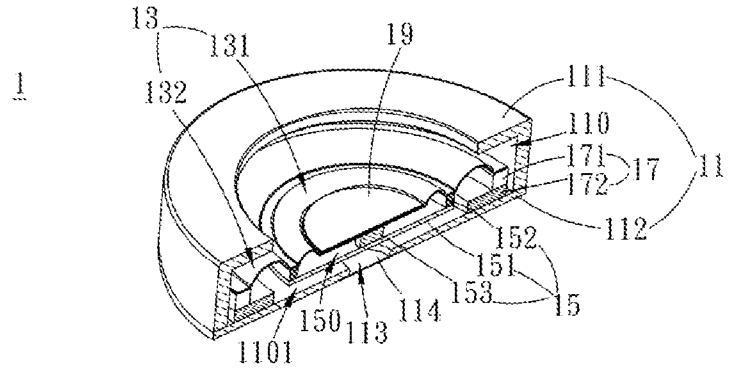
FIG. 2 is the three-dimensional sectional view of A-A' line of FIG. 1.
Figure 3:
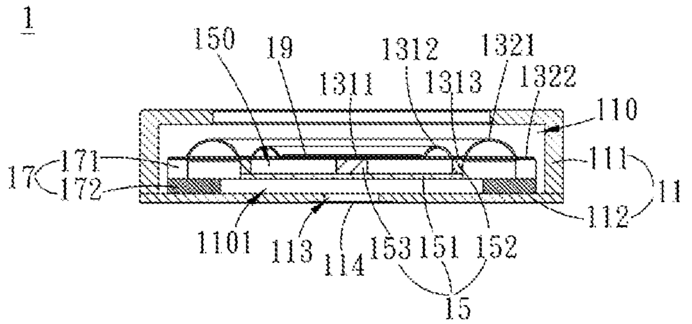
FIG. 3 is the sectional view of A-A' line of FIG. 1.
Figure 4:
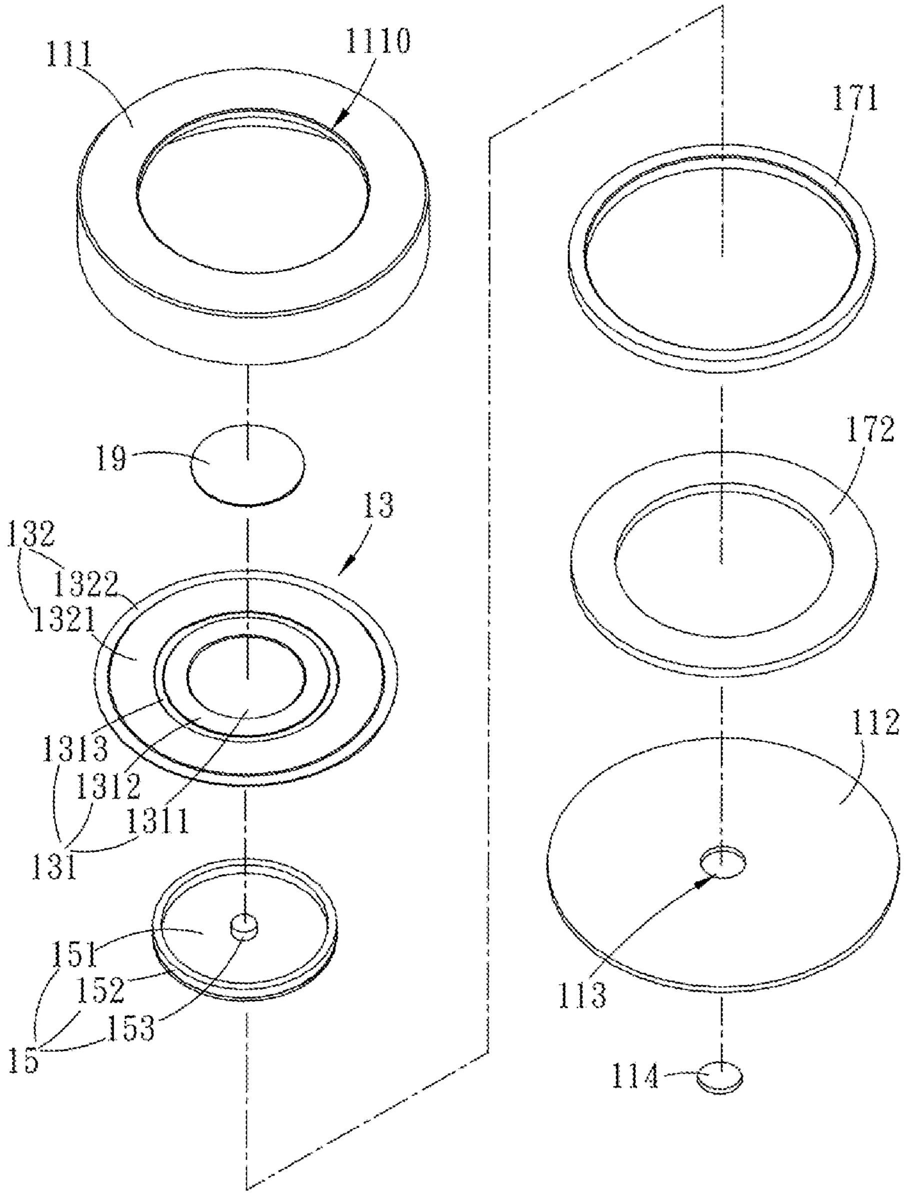
FIG. 4 is the exploded view of the speaker of the first embodiment of the present disclosure.

Refer to FIG. 1 to FIG. 4. FIG. 1 is the perspective view of the speaker of the first embodiment of the present disclosure. FIG. 2 is the three-dimensional sectional view of A-A' line of FIG. 1. FIG. 3 is the sectional view of A-A' line of FIG. 1. FIG. 4 is the exploded view of the speaker. As shown in the figures, the present disclosure provides a speaker 1, which includes: a housing 11, a diaphragm 13, a first vibrating assembly 15 and a second vibrating assembly 17. The housing 11 has an accommodating groove 110. The diaphragm 13 is relatively arranged in the notch 1110 of the accommodation groove 110. The diaphragm 13 has a first diaphragm part 131 and a second diaphragm part 132. The second diaphragm part 132 is arranged around the first diaphragm part 131. The first vibrating assembly 15 is arranged in the first diaphragm part 131, and the first vibrating assembly 15 is used to drive the first diaphragm part 131. The second vibrating assembly 17 is arranged in the accommodation groove 110, and the second vibrating assembly 17 is used for to drive the second diaphragm part 132.

The following embodiments can be implemented based on the speaker structure in the above-mentioned embodiments, and a movable space 1101 between the first vibrating assembly 15 and the bottom of the accommodating groove 110 or/and vibrating the first vibrating assembly 15 through the piezoelectric method.

In this embodiment, the housing 11 is assembled by an upper casing 111 and a lower casing 112. The upper casing 111 has a notch 1110. The notch 1110 communicates with the accommodating groove 110 of the casing 11. The diaphragm 13 is relatively arranged in the notch 1110 of the accommodating groove 110. The first vibrating assembly 15 has a movable space 1101 corresponding to the bottom of the accommodating groove 110. The second vibrating assembly 17 is located around the movable space 1101. The vertical height of the movable space 1101 is from the bottom of the first vibration assembly 15 to the bottom of the accommodating groove 110 of the housing 11, that is, the bottom of the first vibration assembly 15 to the lower casing 112 of the housing 11. The horizontal width of the movable space 1101 is the width of the inner space surrounded by the second vibrating member 172.

In this embodiment, the first vibrating assembly 15 vibrates in a piezoelectric means, and the second vibrating assembly 17 vibrates in a piezoelectric means. The models of the first vibrating assembly 15 and the second vibrating assembly 17 can be selected from Japanese TOKIN ceramic actuator multilayer piezoelectric AL1.65×1.65×5D-4F, but the model is not limited, and suitable vibrating components can be selected according to the needs of users. The first vibrating assembly 15 includes a first bottom plate 151, a first bracket 152 and a first vibrating element 153. The first bracket 152 is disposed on the peripheral side of the first bottom plate 151. The first bracket 152 is connected to the first diaphragm part 131. The first vibrating element 153 is arranged on the first bottom plate 151. The first vibrating element 153 is located in the first bracket 152. The first vibrating element 153 is connected to the first diaphragm part 131. The first bottom plate 151, the first bracket 152 and the first diaphragm part 131 of the first vibrating assembly 15 form a closed cavity 150. The second vibrating assembly 17 includes a second bracket 171 and a second vibrating element 172. The second bracket 171 is connected between the second vibrating element 172 and the second diaphragm part 132. The second vibrating element 172 is a ring vibrator. In addition, the gap of the combined structure between the first vibrating assembly 15 and the second vibrating assembly 17 needs to be sealed with a material such as flexible silicone to prevent sound from leaking from the gap of the combined structure, resulting in frequency response variation.

The first diaphragm part 131 has a first membrane 1311, a first ring 1312 and a first connecting membrane 1313. The first ring 1312 is disposed on the peripheral side of the first membrane 1311. The first connection membrane 1313 is disposed on the peripheral side of the first ring 1312. The second diaphragm part 132 has a second ring 1321 and a second connecting membrane 1322. The second ring 1321 is disposed on the peripheral side of the first connecting membrane 1313. The second bracket 171 is connected to the second connecting membrane 1322. The first membrane 1311, the first connecting membrane 1313 and the second connecting membrane 1322 are in the planar structures. The first ring 1312 and the second ring 1321 are in the convex semicircular structures. Users can adjust the rigidity by properly adjusting the shape, size and material design of the first ring 1312 and the second ring 1321, so as to adjust the resonance frequency of the low-frequency reinforcing part to a target value. Users can also make the first diaphragm part 131 and the second diaphragm part 132 integrally or separately according to their needs and then combine them.

In addition, the speaker 1 further includes a middle sticker 19. The middle sticker 19 is arranged on one side of the first membrane 1311 away from the first vibrating assembly 15. The middle sticker 19 is used to adjust the vibration frequency of the first membrane 1311 to maintain the stability of the frequency vibration, and can also reinforce the structural strength of the first membrane 1311. Furthermore, the lower case 112 of the speaker 1 further includes a first perforation 113 and a first mesh 114. The first perforation 113 is in the lower casing 112 of the housing 11. The first perforation 113 communicates with the accommodating groove 110 and the external space. The first mesh 114 covers the first perforation 113. The above-mentioned first mesh 114 has damping effect. The first mesh 114 can be used to adjust the low frequency response characteristic of the diaphragm 13. The first mesh 114 of this embodiment can be configured according to the needs of users.

In this embodiment, the first diaphragm part 131 of the diaphragm 13 is driven to vibrate by the first vibrating assembly 15, so as to perform sound processing on the whole frequency band. The first vibrating element 153 of the first vibrating assembly 15 is a broadband transducer, such as a piezoelectric vibrator or an electrostatic vibrator, etc. When an audio signal is input to the first vibrating element 153 of the first vibrating assembly 15, the first vibrating element 153 is driven to vibrate. The first vibrating element 153 makes the first diaphragm part 131 of the diaphragm 13 to vibrate, so that the first vibrating assembly 15 generates deformation vibration along the direction perpendicular to the diaphragm 13. The first diaphragm part 131 of the diaphragm 13 deforms and vibrates to generate sound energy and propagates outward. The vibration amplitude of the first vibrating element 153 is proportional to the input voltage. The vibration amplitude of the diaphragm 13 driven by the first vibrating element 153 is equal to the vibration amplitude of the first vibrating element 153 in the vertical direction. The vibration frequency of the first vibrating element 153 is equal to the vibration frequency of the diaphragm 13.

Moreover, the second vibrating assembly 17 drives the second diaphragm part 132 of the diaphragm 13 to vibrate, so as to reinforce the low frequency band. The second vibrating element 172 of the second vibrating assembly 17 is a ring vibrator. A transducer with a large acceleration and a large low-frequency amplitude, such as a moving coil, moving iron, piezoelectric vibrator, etc., may be selected as the vibrator for the second vibrating element 172. When an audio signal is input to the second vibrating element 172 of the second vibrating assembly 17, the second vibrating element 172 is driven to vibrate. The second vibrating element 172 would also produce deformation vibration along the direction perpendicular to the diaphragm 13. The vibration energy of the second vibrating element 172 is transmitted to the second connecting membrane 1322 of the second diaphragm part 132 along the second bracket 171, that is, the second bracket 171 is linked to the outer edge of the diaphragm 13, thus affecting the entire diaphragm 13 to vibrate. The vibration also drives the first vibrating assembly 15 arranged on the diaphragm 13 vibrates vertically at the same time.

Furthermore, since the first vibrating assembly 15 is disposed on the first diaphragm part 131, that is, the first vibrating assembly 15 is located in the middle of the diaphragm 13, a movable space 1101 is formed between the first vibrating assembly 15 and in the accommodation groove 110 of the housing 11. In other words, the diaphragm 13 relatively suspends the first vibrating assembly 15 so that the first vibrating assembly 15 is in a suspended state. The suspension relationship between the diaphragm 13 and the first vibration assembly 15 is regarded as an elastic system; the diaphragm 13 is an elastic part of the elastic system, and the first vibration assembly 15 is a suspended weight. The resonant frequency of this vibration system can be calculated according to the weight of the diaphragm 13 and the first vibration assembly 15. The calculation formula is as follows:

$$F_D[\mathrm{Hz}] = \frac{1}{2\pi}\frac{1}{\sqrt{M_{ms}[\mathrm{kg}] * C_{ms}[m/N]}} \cdot K_{ms} = \frac{1}{C_{ms}}$$

In the formula, Fo is the resonant frequency of the system; Mms is the system mass. The system mass includes the mass of the first vibrating assembly 15 and the mass of the diaphragm 13. The mass of the first vibrating assembly 15 accounts for most of the total mass. Cms is the system compliance. The system compliance Cms is the degree of elasticity provided by the diaphragm 13. The system compliance Cms is inversely proportional to the system elasticity Kms. The user can adjust the resonant frequency of the elastic system through the elasticity of the diaphragm e 13 and the mass of the first vibrating assembly 15 to achieve a target low-frequency resonant frequency value.

In this embodiment, the speaker 1 is respectively provided with the first vibrating assembly 15 and the second vibrating assembly 17 on the diaphragm 13 for the full frequency band and the low frequency compensation frequency band, so that the full frequency band of the first vibrating assembly 15 and the low frequency compensation frequency band of the second vibrating assembly 17 is complementary. Users can also independently input signals to the first vibrating assembly 15 and the second vibrating assembly 17 according to usage conditions, and achieve optimized frequency response and sound quality by adjusting signal strengths in different frequency bands.

Figure 5:
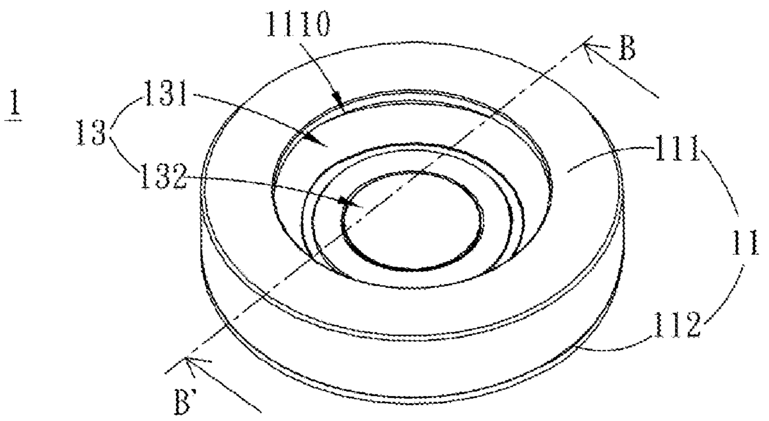
FIG. 5 is the perspective view of the speaker of the second embodiment of the present disclosure.
Figure 6:
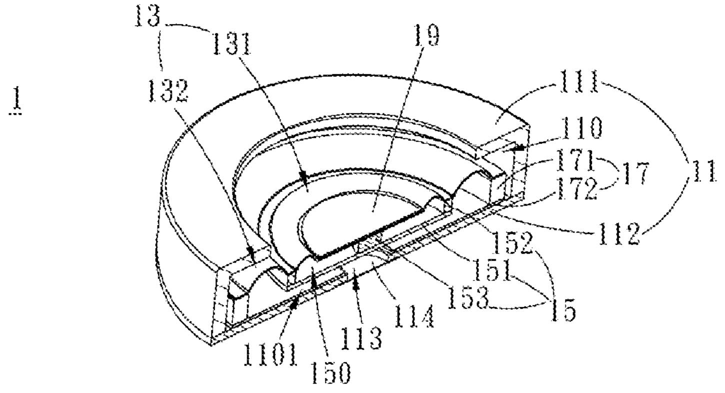
FIG. 6 is the three-dimensional sectional view of the B-B' line of FIG. 5.
Figure 7:
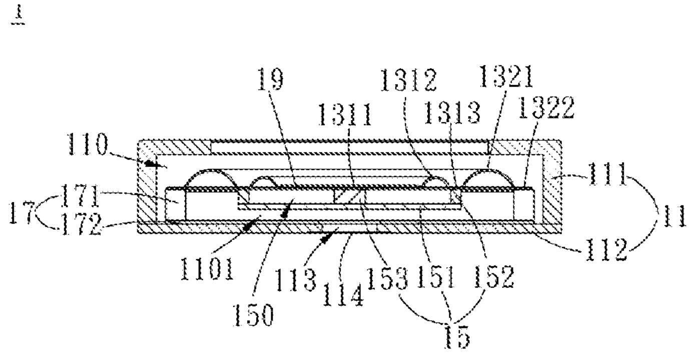
FIG. 7 is the sectional view of the B-B' line of FIG. 5.
Figure 8:
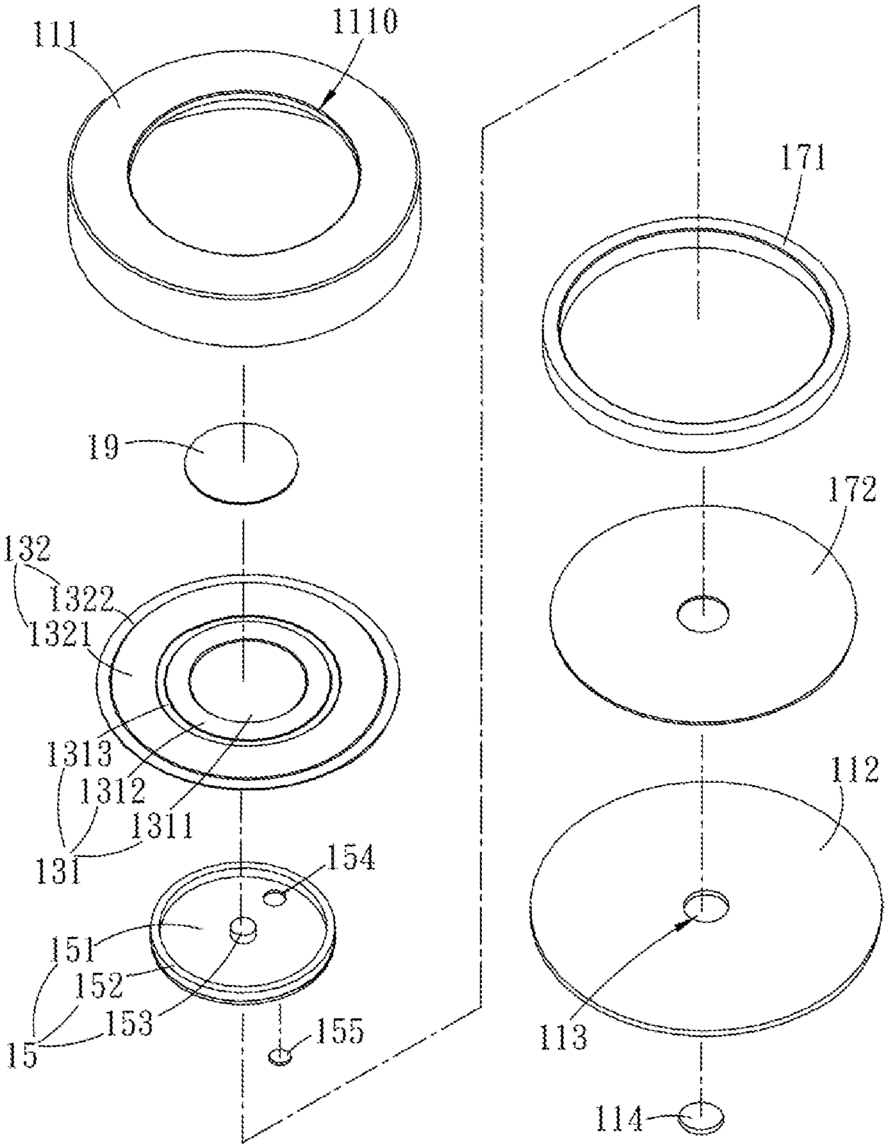
FIG. 8 is the exploded view of the speaker of the second embodiment of the present disclosure.

Refer to FIG. 5 to FIG. 8. FIG. 5 is the perspective view of the speaker of the second embodiment of the present disclosure. FIG. 6 is the three-dimensional sectional view of the B-B' line of FIG. 5. FIG. 7 is the sectional view of the B-B' line of FIG. 5. FIG. 8 is the exploded view of the speaker. As shown in the figure, the difference between this embodiment and the first embodiment lies in the thickness and surface area of the second vibrating element 172. The thickness of the second vibrating element 172 in this embodiment is thin and the surface area is large. The second vibrating element 172 is laid on the bottom of the accommodating groove 110. The vertical height of the movable space 1101 is from the bottom of the first vibrating assembly 15 to the surface of the second vibrating member 172 on the bottom of the accommodating groove 110. The horizontal width of the movable space 1101 is the width of the inner wall of the second bracket 171 of the second vibrating assembly 17. Thus, the movable space 1101 of this embodiment has a small vertical height and a large horizontal width.

In addition, please refer to FIG. 8, the difference of this embodiment compared with the first embodiment further includes the second perforation 154 and the second mesh 155 on the first vibrating assembly 15. The first bottom plate 151 and the first bracket 152 of the first vibrating assembly 15 and the first diaphragm part 131 of the diaphragm 13 forms the cavity 150. The second perforation 154 is located on the first bottom plate 151. The second through hole 154 communicates with the cavity 150 and the accommodating groove 110. The second mesh 155 covers the second perforation 154. The above-mentioned second mesh 155 has a damping effect, and the second mesh 155 can be used to adjust the low-frequency response characteristics of the first vibrating assembly 15 and the first diaphragm part 131. The function of the second mesh 155 in this embodiment is the same as that of the first mesh 114, and it can be arranged according to the needs of users.

Figure 9:
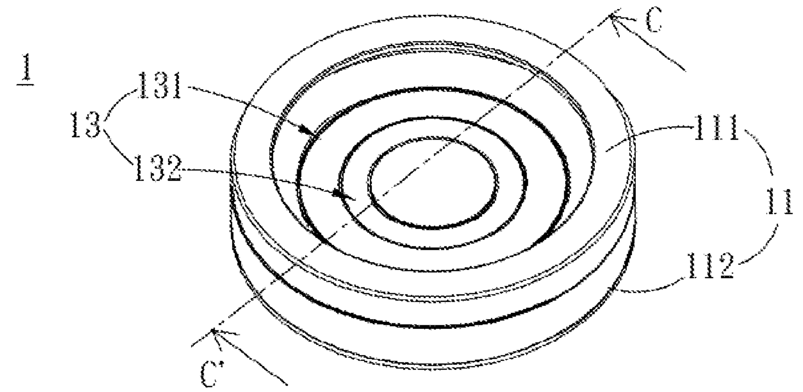
FIG. 9 is the perspective view of the speaker of the third embodiment of the present disclosure.
Figure 10:
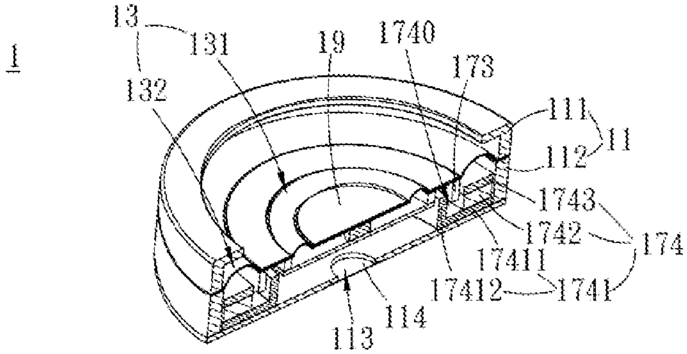
FIG. 10 is the three-dimensional sectional view of the C-C' line of FIG. 9.
Figure 11:
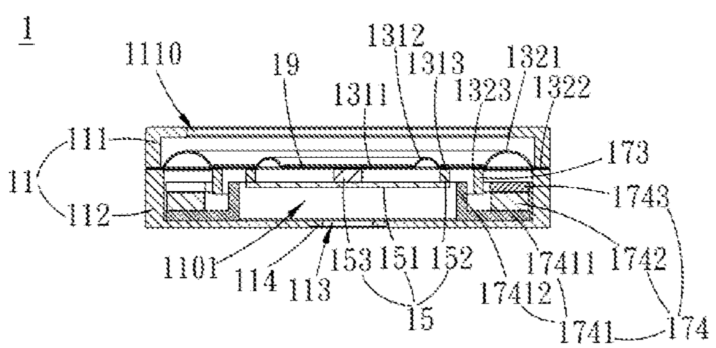
FIG. 11 is the sectional view of the C-C' line of FIG. 9.
Figure 12:
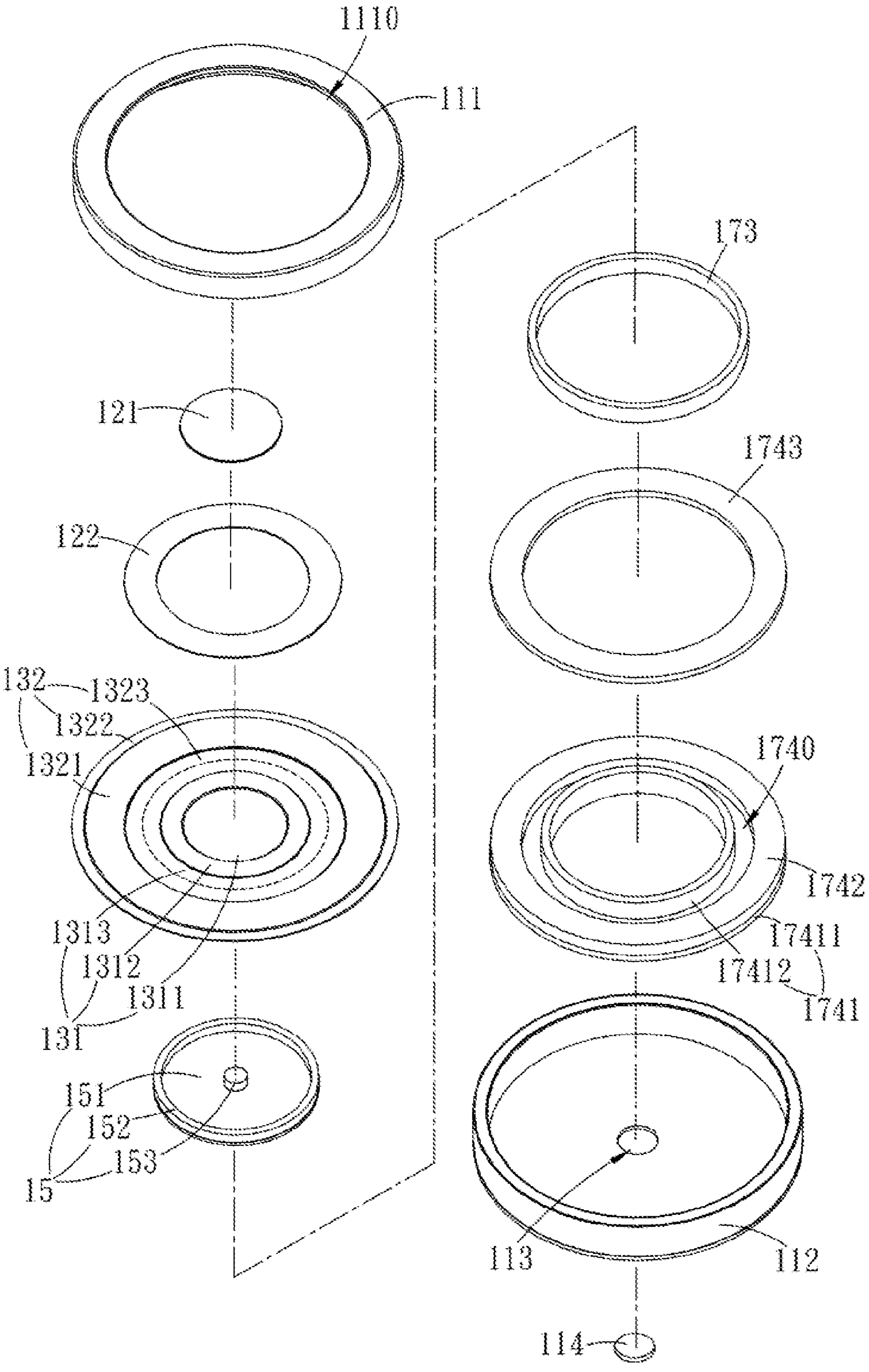
FIG. 12 is an exploded view of a speaker according to a third embodiment of the present disclosure.

Refer FIG. 9 to FIG. 12. FIG. 9 is the perspective view of the speaker of the third embodiment of the present disclosure. FIG. 10 is the three-dimensional sectional view of the C-C' line of FIG. 9. FIG. 11 is the sectional view of the C-C' line of FIG. 9. FIG. 12 is an exploded view of a speaker. As shown in the figure, the difference between this embodiment and the first embodiment lies in the second vibrating assembly 17. In this embodiment, the first vibrating assembly 15 vibrates by piezoelectric means. The second vibrating assembly 17 vibrates by means of electromagnetic induction. The first vibrating assembly 15 includes a first bottom plate 151, a first bracket 152 and a first vibrating member 153. The first bracket 152 is disposed on the peripheral side of the first bottom plate 151. The first bracket 152 is connected to the first diaphragm part 131. The first vibrating element 153 is disposed on the first bottom plate 151. The first vibrating element 153 is located in the first bracket 152. The first vibrating element 153 is connected to the first diaphragm part 131. The second vibration assembly 17 includes a voice coil 173 and a magnetic assembly 174. One end of the voice coil 173 is connected to the second diaphragm part 132, and the other end of the voice coil 173 is located in the magnetic assembly 174.

The first diaphragm part 131 has a first membrane 1311, a first ring 1312 and a first connecting membrane 1313. The first ring 1312 is disposed on the peripheral side of the first membrane 1311. The first connection film 1313 is disposed on the peripheral side of the first ring 1312. The second diaphragm part 132 has a second membrane 1323, a second ring 1321 and a second connecting membrane 1322. The second membrane 1323 is disposed on the peripheral side of the first connecting membrane 1313. The second thin membrane 1323 and the first connecting membrane 1313 have the same planar structure. The second ring 1321 is disposed on the peripheral side of the second membrane 1323. The second connecting membrane 1322 is disposed on the peripheral side of the second ring 1321. The first vibrating element 153 is connected to the first membrane 1311. The first bracket 152 is connected to the first connecting membrane 1313. One end of the voice coil 173 is connected to the second membrane 1323. The second connecting membrane 1322 is arranged in the housing 11. The second connecting membrane 1322 is fixed between the upper casing 111 and the lower casing 112.

In this embodiment, the magnetic assembly 174 includes a magnetic carrier 1741, a magnetic body 1742 and a magnetic member 1743. The magnetic carrier 1741 has a magnetic bottom plate 17411 and a magnetic carrier side wall 17412. The magnetic side wall 17412 is arranged on the inner side of the magnetic bottom plate 17411. There is a gap 1740 between the magnetic body 1742 and the magnetic carrier 1741. The magnetic member 1743 is disposed on the magnetic body 1742, and the other end of the voice coil 173 is located in the gap 1740.

When the current of the external power supply flows into the voice coil 173, the voice coil 173 generates a magnetic field under the action of the current, such that the magnitude and direction of the magnetic field produced by the voice coil 173 can be changed by changing the current amount flowing into the voice coil 173 respectively. The voice coil 173 interacts with the magnetic field of the magnetic body 1742 to make the voice coil 173 vibrate orthogonally to the current direction. One end of the voice coil 173 is connected to the second membrane 1323. The second membrane 1323 moves inwardly with the first connecting membrane 1313, and the second membrane 1323 moves outwards to the second ring 1321 such that one side of the voice coil 173 drives the entire diaphragm 13 to vibrate. The diaphragm 13 generates sound by vibrating. The magnetic guide 1743 can cover most range of the magnetic force lines of the magnetic body 1742. The magnetic guide 1743 can help the magnetic field lines of the magnetic body 1742 to concentrate, so that the magnetic body 1742 and the voice coil 173 can have a better resonance effect.

Furthermore, the speaker 1 further includes a first middle sticker 161 and a second middle sticker 162. The first middle sticker 161 is arranged on the side of the first membrane 1311 away from the first vibrating assembly 15. The second middle paste 162 is arranged on the first connecting membrane 1313 and the second membrane 1323. The first middle sticker 161 is used to adjust the vibration frequency of the first membrane 1311, and can also reinforce the structural strength of the first membrane 1311. The second middle paste 162 is used to adjust the vibration frequency of the first connecting membrane 1313 and the second membrane 1323 to maintain the stability of the frequency vibration, and can also reinforce the structural strength of the first connecting membrane 1313 and the second membrane 1323.

In summary, the disclosure provides a speaker respectively configured with the first vibrating assembly and the second vibrating assembly for the full frequency band and the low frequency compensation frequency band, so that the full frequency band of the first vibrating assembly and the low frequency compensation frequency band of the second vibrating assembly is complementary. Users can also independently input signals to the first vibrating assembly and the second vibrating assembly according to usage conditions, and achieve optimized frequency response and sound quality by adjusting signal strengths in different frequency bands.

It is to be understood that the term "comprises", "comprising", or any other variants thereof, is intended to encompass a non-exclusive inclusion, such that a process, method, article, or device of a series of elements not only comprise those elements but further comprises other elements that are not explicitly listed, or elements that are inherent to such a process, method, article, or device. An element defined by the phrase "comprising a . . . " does not exclude the presence of the same element in the process, method, article, or device that comprises the element.

Although the present disclosure has been explained in relation to its preferred embodiment, it does not intend to limit the present disclosure. It will be apparent to those skilled in the art having regard to this present disclosure that other modifications of the exemplary embodiments beyond those embodiments specifically described here may be made without departing from the spirit of the disclosure. Accordingly, such modifications are considered within the scope of the disclosure as limited solely by the appended claims.

What is claimed is:

1. A speaker, comprising:
a housing having an accommodating groove;
a diaphragm relatively arranged in the accommodating groove, the diaphragm comprising a first diaphragm part and a second diaphragm part, the second diaphragm part arranged around the first diaphragm part;
a first vibrating assembly, arranged on the first diaphragm part, for driving the first diaphragm part; a movable space being formed between the first diaphragm part and a bottom of the accommodating groove; and
a second vibrating assembly, arranged in the accommodating groove, for driving the second diaphragm part.

2. The speaker according to claim 1, wherein the second vibrating assembly is arranged around a peripheral side of the movable space and does not interfere with the movable space.

3. The speaker according to claim 1, wherein the first vibrating assembly comprises a first bottom plate, a first bracket and a first vibrating element; the first bracket is arranged on a peripheral side of the first bottom plate; the first bracket is connected to the first diaphragm part; the first vibrating element is arranged on the first bottom plate; the first vibrating element is located in the first bracket; the first vibrating element is connected to the first diaphragm part; the second vibrating assembly comprises a second bracket and a second vibrating element; the second bracket is connected between the second vibrating element and the second diaphragm part.

4. The speaker according to claim 3, wherein the first diaphragm part comprises a first membrane, a first ring and a first connecting membrane; the first ring is arranged on a peripheral side of the first membrane; the first connecting membrane is arranged on a peripheral side of the first ring; the second diaphragm part comprises a second ring and a second connecting membrane; the second ring is arranged on a peripheral side of the first connecting membrane; the second connecting membrane is arranged on a peripheral side of the second ring; the first vibrating element is connected to the first membrane; the first bracket is connected to the first connecting membrane; the second bracket is connected to the second connecting membrane.

5. The speaker according to claim 4, further comprising a middle sticker; wherein the middle sticker is arranged on one side of the first membrane away from the first vibrating assembly.

6. The speaker according to claim 1, wherein the first vibrating assembly comprises a first bottom plate, a first bracket and a first vibrating element; the first bracket is arranged on a peripheral side of the first bottom plate; the first bracket is connected to the first diaphragm part; the first vibrating element is arranged on the first bottom plate; the first vibrating element is located in the first bracket; the first vibrating element is connected to the first diaphragm part; the second vibrating assembly comprises a voice coil and a magnetic member; one end of the voice coil is connected to the second diaphragm part; an another end of the voice coil is located in the magnetic member.

7. The speaker according to claim 6, wherein the first diaphragm part comprises a first membrane, a first ring and a first connecting membrane; the first ring is arranged on a peripheral side of the first membrane; the first connecting membrane is arranged on a peripheral side of the first ring; the second diaphragm part comprises a second membrane, a second ring and a second connecting membrane; the second membrane is arranged on a peripheral side of the first connecting membrane; the second ring is arranged on a peripheral side of the second membrane; the second connecting membrane is arranged on a peripheral side of the second ring; the first vibrating element is connected to the first membrane; the first bracket is connected to the first connecting membrane; the first bracket is connected to the first connecting membrane; one end of the voice coil is connected to the second membrane; the second connecting membrane is fixed on the housing.

8. The speaker according to claim 7, further comprising a first middle sticker and a second middle sticker; wherein the first middle sticker is arranged on the side of the first membrane away from the first vibration assembly; the second middle sticker is arranged on the first connecting membrane and the second membrane.

9. The speaker according to claim 6, wherein the magnetic assembly comprises a magnetic carrier, a magnetic body and a magnetic member; the magnetic carrier comprises a magnetic bottom plate and a magnetic side wall; the magnetic side wall is arranged on the inner side of the magnetic bottom plate; the magnetic body is arranged on the magnetic bottom plate; a space is formed between the magnetic body and the magnetic carrier; the magnetic remember is arranged on the magnetic body; the another end of the voice coil is located within the space.

10. The speaker according to claim 6, wherein the first vibrating assembly further comprises a second perforation and a second mesh; the first bottom plate, the first bracket and the first diaphragm part form a cavity; the second perforation is on the first bottom plate; the second perforation communicates with the cavity and the accommodating groove; the second mesh covers the second perforation.

11. The speaker according to claim 1, further comprises a first perforation and a first mesh; the first perforation is located on the housing; the first perforation communicates with the accommodating groove; the first mesh covers the first perforation.

12. The speaker according to claim 1, wherein the first vibrating assembly vibrates through piezoelectric means; the second vibrating assembly vibrates through electromagnetic induction or piezoelectric means.

13. A speaker, comprising:
a housing having an accommodating groove;
a diaphragm relatively arranged in the accommodating groove, the diaphragm comprising a first diaphragm part and a second diaphragm part, the second diaphragm part arranged around the first diaphragm part;
a first vibrating assembly, arranged on the first diaphragm part, for driving the first diaphragm part; the first vibrating assembly vibrating through piezoelectric means; and
a second vibrating assembly, arranged in the accommodating groove, for driving the second diaphragm part.

14. The speaker according to claim 13, wherein a movable space is formed between the first vibrating assembly and the bottom of the accommodating groove; the second vibrating assembly is arranged around the peripheral side of the movable space.

15. The speaker according to claim 13, wherein the second vibrating assembly vibrates through electromagnetic induction or piezoelectric means.

16. The speaker according to claim 13, wherein the first vibrating assembly comprises a first bottom plate, a first bracket and a first vibrating element; the first bracket is arranged on a peripheral side of the first bottom plate; the first bracket is connected to the first diaphragm part; the first vibrating element is arranged on the first bottom plate; the first vibrating element is located in the first bracket; the first vibrating element is connected to the first diaphragm part; the second vibrating assembly comprises a second bracket and a second vibrating element; the second bracket is connected between the second vibrating element and the second diaphragm part.

17. The speaker according to claim 16, wherein the first diaphragm part comprises a first membrane, a first ring and a first connecting membrane; the first ring is arranged on a peripheral side of the first membrane; the first connecting membrane is arranged on a peripheral side of the first ring; the second diaphragm part comprises a second ring and a second connecting membrane; the second ring is arranged on a peripheral side of the first connecting membrane; the second connecting membrane is arranged on the peripheral side of the second ring; the first vibrating element is connected to the first membrane; the first bracket is connected to the first connecting membrane; the second bracket is connected to the second connecting membrane.

18. The speaker according to claim 13, wherein the first vibrating assembly comprises a first bottom plate, a first bracket and a first vibrating element; the first bracket is arranged on a peripheral side of the first bottom plate; the first bracket is connected to the first diaphragm part; the first vibrating element is arranged on the first bottom plate; the first vibrating element is located in the first bracket; the first vibrating element is connected to the first diaphragm part; the second vibrating assembly comprises a voice coil and a magnetic member; one end of the voice coil is connected to the second diaphragm part; an another end of the voice coil is located in the magnetic member.

19. The speaker according to claim 18, wherein the first diaphragm part comprises a first membrane, a first ring and a first connecting membrane; the first ring is arranged on a peripheral side of the first membrane; the first connecting membrane is arranged on a peripheral side of the first ring; the second diaphragm part comprises a second membrane, a second ring and a second connecting membrane; the second membrane is arranged on a peripheral side of the first connecting membrane; the second ring is arranged on a peripheral side of the second membrane; the second connecting membrane is arranged on a peripheral side of the second ring; the first vibrating element is connected to the first membrane; the first bracket is connected to the first connecting membrane; the first bracket is connected to the first connecting membrane; one end of the voice coil is connected to the second membrane; the second connecting membrane is fixed on the housing.

* * * * *